(12) United States Patent
Kasemsuwan et al.

(10) Patent No.: US 11,974,589 B2
(45) Date of Patent: May 7, 2024

(54) PROCESS FOR PREPARING FISH BONE POWDER

(71) Applicant: THAI UNION GROUP PUBLIC COMPANY LIMITED, Samutsakorn (TH)

(72) Inventors: Tunyawat Kasemsuwan, Bangkok (TH); Supaporn Boontiang, Bangkok (TH)

(73) Assignee: THAI UNION GROUP PUBLIC COMPANY LIMITED, Samutsakorn (TH)

( * ) Notice: Subject to any disclaimer, the term of this patent is extended or adjusted under 35 U.S.C. 154(b) by 271 days.

(21) Appl. No.: 16/069,828

(22) PCT Filed: Jan. 26, 2016

(86) PCT No.: PCT/TH2016/000006
§ 371 (c)(1),
(2) Date: Jul. 12, 2018

(87) PCT Pub. No.: WO2017/131592
PCT Pub. Date: Aug. 3, 2017

(65) Prior Publication Data
US 2019/0014802 A1 Jan. 17, 2019

(51) Int. Cl.
*A23L 17/10* (2016.01)
*A23J 1/10* (2006.01)
(Continued)

(52) U.S. Cl.
CPC ................ *A23L 17/10* (2016.08); *A23J 1/10* (2013.01); *A23L 5/21* (2016.08); *A23L 5/23* (2016.08);
(Continued)

(58) Field of Classification Search
CPC ..... A23L 5/23; A23L 5/21; A23L 5/25; A23L 17/10; A23L 5/27; A23L 5/276
See application file for complete search history.

(56) References Cited

U.S. PATENT DOCUMENTS 5,021,338 A * 6/1991 Gianna ................... C12P 21/06
426/47
6,342,252 B1 * 1/2002 Song ......................... A23J 1/10
424/520
(Continued)

FOREIGN PATENT DOCUMENTS

JP 52-136968 A 11/1977
JP 10-70968 A 3/1998
(Continued)

OTHER PUBLICATIONS

Hemung, "Properties of Tilapia Bone Powder and Its Calcium Bioavailability Based on Transglutaminase Assay", International Journal of Bioscience, Biochemistry and Bioinformatics, vol. 3, No. 4, Jul. 2013, pp. 306-309. (Year: 2013).*
(Continued)

*Primary Examiner* — Changqing Li
(74) *Attorney, Agent, or Firm* — Seed IP Law Group LLP (57) ABSTRACT

A process for preparing fish bone powder according to this invention generally comprising at least 4 steps: pre-heating, removing of impurity, drying and milling to derive a calcium-rich bone powder product that contains calcium in the range of 18-22 g/100 g of the fmal product. In addition, the bone powder particle size obtained is less than 100 microns and contains high levels of protein, fat, and essential minerals, such as sodium and phosphorus. The source of bone can be obtained from any fishes, preferably from tuna.

19 Claims, 4 Drawing Sheets

Table 1

|  | NaOH 0.5% (90 °C) | | | Control |
|---|---|---|---|---|
|  | 1 h | 2 h | 3 h | (No alkali treatment) |
| Protein (% w/w) | 25.1 | 25 | 25.1 | 26 |
| Fat (% w/w) | 2.4 | 2.4 | 2.2 | 7.9 |
| TBA (mg/Kg) | 225 | 226 | 221 | 300-400 |

(51) Int. Cl.
    *A23L 5/20*     (2016.01)
    *A23L 17/00*     (2016.01)

(52) U.S. Cl.
    CPC .............. *A23L 5/25* (2016.08); *A23L 17/70* (2016.08); *A23V 2002/00* (2013.01)

(56) References Cited

U.S. PATENT DOCUMENTS

| | | | | |
|---|---|---|---|---|
| 2002/0182290 | A1* | 12/2002 | Nielsen | A23K 50/40 426/56 |
| 2013/0084228 | A1* | 4/2013 | Li | C01B 25/16 423/175 |

FOREIGN PATENT DOCUMENTS

| | | | |
|---|---|---|---|
| JP | 1070968 | A * | 3/1998 |
| JP | 11318389 | A * | 11/1999 |
| JP | 2000-60496 | A | 2/2000 |
| JP | 2002-238504 | A | 8/2002 |

OTHER PUBLICATIONS

English Translation of Yoshiaki et al., JPH11318389 (A), pp. 1-6. (Year: 1999).*

English Translation of Mamoru et al. JPH1070968 (A), pp. 1-7. (Year: 1998).*

Full English Translation of Masakatsu, JP2002238504(A), pp. 1-5. (Year: 2002).*

Prabakaran, "Development of Hydroxyapatite from Natural Fish Bone through Heat Treatment", Trends, Biomater. Artif. Organs, 2006, 20(1), pp. 20-23 (Year: 2006).*

Yin, "Effects of nano-scaled fish bone on the gelation properties of Alaska pollock surimi", Food Chemistry, 2014, 250, pp. 463-468. (Year: 2006).*

International Search Report, dated Aug. 23, 2016, for International Application No. PCT/TH2016/000006, 2 pages.

* cited by examiner

Table 1

|  | NaOH 0.5% (90 °C) | | | Control |
|---|---|---|---|---|
|  | 1 h | 2 h | 3 h | (No alkali treatment) |
| Protein (% w/w) | 25.1 | 25 | 25.1 | 26 |
| Fat (% w/w) | 2.4 | 2.4 | 2.2 | 7.9 |
| TBA (mg/Kg) | 225 | 226 | 221 | 300-400 |

*FIG. 1*

Table 2

| Color | NaOH 0.5% (90 °C) | | |
|---|---|---|---|
|  | 1 h | 2 h | 3 h |
| L* (+ light, - dark) | 78.42 | 79.97 | 80.13 |
| a* (+ red, - green) | 3.26 | 3.23 | 3.12 |
| b* (+ yellow, - blue) | 23.51 | 23.07 | 22.45 |

*FIG. 2*

Table 3

|  | Control | Treat with hexane |
|---|---|---|
| Protein (% w/w) | 26.4 | 22.8 |
| Fat (% w/w) | 1.4 | 1.2 |

*FIG. 3*

Table 4

| Treatment | 1 | 2 | 3 | 4 |
|---|---|---|---|---|
|  | Neutral protease | Alkali protease | Neutral Protease + Alkali protease | Protamax |
| Protein (% w/w) | 26.3 | 26.4 | 26.9 | 25.7 |
| Fat (% w/w) | 2.0 | 2.6 | 2.0 | 3.0 |

*FIG. 4*

Table 5

| Treatment | 1 | 2 | 3 | 4 |
|---|---|---|---|---|
| | Neutral protease (GN) | Alkali protease (P6) | Neutral Protease (GN) + Alkali protease (P6) | Protamax |
| Protein (% w/w) | 26.8 | 25.9 | 25.7 | 26.1 |
| Fat (% w/w) | 0.9 | 0.7 | 0.8 | 0.6 |
| TBA (mg/Kg) | 83 | 61.1 | 68.4 | 63.5 |

*FIG. 5*

Table 6

| Treatment | Cooking with hot water | Cooking with steam |
|---|---|---|
| Protein (% w/w) | 23.3 | 23.3 |
| Fat (% w/w) | 1.3 | 0.7 |
| TBA (mg/Kg) | 48.4 | 34.1 |

*FIG. 6*

Table 7

| Treatment | 1 | 2 | 3 | 4 |
|---|---|---|---|---|
| | Cooking with Hot water | | Cooking with Steam | |
| | Protease enzyme (Protamex) | NaOH + Protease enzyme (Protamex) | Protease enzyme (Protamex) | NaOH + Protease enzyme (Protamex) |
| Protein (% w/w) | 26.2 | 26.1 | 25.9 | 25.8 |
| Fat (% w/w) | 0.9 | 0.9 | 1.3 | 1.1 |
| TBA (mg/Kg) | 48.6 | 38.6 | 51.7 | 54 |

*FIG. 7*

Table 8

| Treatment | 1 | 2 | 3 | 4 |
|---|---|---|---|---|
| | Cooking with Hot water | | Cooking with Steam | |
| | Protease enzyme (Protamex) | NaOH + Protease enzyme (Protamex) | Protease enzyme (Protamex) | NaOH + Protease enzyme (Protamex) |
| $L^*$ (+ light, - dark) | 76.51 | 75.87 | 71.44 | 75.57 |
| $a^*$ (+ red, - green) | 2.91 | 2.96 | 3.91 | 3.33 |
| $b^*$ (+ yellow, - blue) | 18.09 | 17.52 | 19.6 | 17.86 |

*FIG. 8*

Table 9

| Tuna calcium | | | Mineral content | | |
|---|---|---|---|---|---|
| Moisture | g/100g | 5 | Calcium | mg/100g | 19,208 |
| Protein | g/100g | 26 | Phosphorus | mg/100g | 10,315 |
| Fat | g/100g | 1 | Sodium | mg/100g | 874.6 |
| Ash | g/100g | 65 | Iron | mg/100g | 1.7 |
| | | | Magnesium | mg/100g | 288 |
| | | | Zinc | mg/100g | 11 |
| | | | Potassium | mg/100g | 5.2 |

*FIG. 9*

Table 10

| Composition | | Normal fish frame (%) | Tuna Calcium (%) |
|---|---|---|---|
| Moisture | g/100g | 70 %, | 5% |
| Protein | g/100g | 14 %, (43)* | 26 %, (27)* |
| Fat | g/100g | 4 %, (12)* | 1 %, (1.05)* |
| Ash | g/100g | 12%, (40)* | 65%, (68.42)* |
| Calcium | mg/100g | 11,552, (20,280)* | 19,208, (20,218)* |

PROCESS FOR PREPARING FISH BONE POWDER

FIELD OF THE INVENTION

The field relates to the food processing science and technology, especially in the field of the production of fish bone powder, preferably the calcium powder production.

DESCRIPTION OF THE RELATED ART

Calcium is the fifth most abundant element in the human body. It plays an important role in many physiological processes, including nerve and muscle functions. Furthermore, calcium is required for a normal growth and the development and maintenance of the skeleton which provides strength and structure of the body.

Over 99% of total body calcium is found in the teeth and bones. As bone contains a high proportion of the body calcium, it is the major reservoir for calcium in most vertebrates and the main component of bone calcium is hydroxyapatite.

Fish bone is known to be a good source of calcium which is normally consumed in the form of a whole fish or the fish stock.

Larden et al (2000) reported that the intake of whole small fish with bone can increase calcium bioavailability and the small fishes may be an important source of calcium.

Tuna bone, similar to any other animal bones, is mainly composed of calcium and phosphate in the form of hydroxyapatite $Ca_{10}(PO_4)_6(OH)_2$ crystal and other ions. The organic phase of the bone is composed of collagen fibers, and ground substances formed by glycoproteins and proteoglycans (Prentice et al. 2003). This makes tuna bone and the partial composition thereof the preferred sources of natural calcium used for the addition or fortification in the seafood products. The need for potential sources of calcium which has high calcium content and less undesirable components has been increased due to the global market demand for healthy foods. Previously, the processes for removal of undesirable component from the animal bones focused on the certain aspects as reviewed in the following references. A patent document EP2075231A1 disclosed the biphasic calcium phosphate and method for obtaining same from fish bones. This method includes the steps of calcination and grinding of the fish bones wherein the calcination is carried out at a temperature comprised between 600 and 1200° C., preferably between 900 and 950° C. Furthermore, this invention also disclosed the process for obtaining the biphasic calcium phosphate wherein the laser beam is applied on fish bones that are not ground, and then subjected at the same time to a temperature comprised between 200 and 400° C. A patent document CN104342474A also disclosed the method wherein the waste from tuna fish was treated with alkaline protease enzyme to be separated from the fish bones, the supernatant liquid was centrifuged and the supernatant was removed from the precipitation. Precipitation was separated in order to isolate the fish bones. A patent document CN103156186B disclosed the invention regarding calcium tablet using deep-sea fish bone as raw material and preparation method thereof. The process of preparing the fish bone according to this invention includes the following steps; 1) the fish bones from deep-sea fish were cleaned, degreased, dried and then pulverized to a particle size of 300 mesh or powder; 2) the pulverized bone meal was treated with 0.5-1.5 mol/L sodium hydroxide solution in a 1:4 to 1:6 mass ratio and soaked for 24-36 hours. The mixture was filtered and washed with distilled water until the fish bone meal has neutral pH. The fish bone meal was then immersed in 50-70% (w/w) ethanol solution for 12-18 hours wherein the mass ratio of bone meal and fish ethanol solution of 1:4 to 1:6. After washing with distilled alcohol, the solid phase was removed by filtration and dried to a moisture content of 9-11% (w/w) of the fish bone meal; 3) prepared fish bone meal and distilled water in a 1:0.5-1:1.5 mass ratio in a container, 2 to 3% of enzyme papain was added to fish bone meal and stirred, the solution was then heated until the center temperature reached 40-45° C., holding the said temperature for 1-2 hours, filtered, washed with distilled water fish bone meal, dried to a moisture content of 9-11% (w/w); 4) prepared fish bone meal set by mixing with citric acid and hydrochloric acid at the ratio of 1:9-1:11 and soaked for 36-60 hours. The solid phase was removed, washed with distilled water to a neutral pH and dried to a moisture content of 9-11% (w/w); 5) fish bone meal was mixed with skimmed milk powder, lactitol and aspartame. Calcium according to this invention has both high solubility and bioavailability characteristics which can promote the body's absorption of calcium. A patent document CN101032311A disclosed the invention regarding Fish bean curd including high dietary calcium. The high calcium fish bean curd is made with refined crushed fish, fish soup and jellied bean curd, and the making process includes the following steps: making fish soup with fish bones through cooking and filtering, crushing fish meat, making jellied bean curd with soybean and halogen, adding calcium lactate into jellied bean curd, mixing fish soup, jellied bean curd and crushed fish meat in a pan, steaming in a steam kettle, packing and freezing. A high calcium fish, tofu, which is made late and refined fish soup with bean curd made, characterized by making approach is to turn the fish bones and skulls of impurities inside the fish, take fish bones and fish skull 10 kg innocence boiled soup from refined fish wrapped into the pot, and then boiled old soup, add a little sugar, white pepper and vinegar and fresh, refined fish broken into late spare, old soup filtered to remove impurities from the water After soaking soybeans ground into a paste 12-15 kg of water to boil and cooked into a halogen into bean curd, bean curd 500-600 grams of added calcium lactate, take the old Stir soup, add a little starch, refined fish with broken end and curd Calibrating mix into the dish, put the pot boiling steam, finished packaging, frozen storage. Patent document U.S. Pat. No. 5,905,093A disclosed fish scale extract as a calcium supplement. The present invention is directed to a calcium rich preparation which is prepared by soaking fish scales in an acidic solution for a defined period of time. This fish scale extract can be used as food supplement to prevent or reduce the risk of bone loss or other calcium deficiency. The calcium form in this fish scale extract can be readily absorbed by the skin. A patent document CN101971970B disclosed the invention relates to a processing method for fishbone sauce, and belongs to the technical field of fish byproduct processing. The fishbone sauce is characterized by comprising the following components in percentage by mass: 60 to 80 percent of fishbone paste, 4 to 6 percent of edible salt, 3 to 5 percent of soft sugar, 0.3 to 0.5 percent of cooked white sesame seed, 0.5 to 2 percent of red chili powder, 1 to 2 percent of cooked ground peanut, 1 to 3 percent of fermented soy sauce, 0.2 to 0.4 percent of thickener, 0.1 to 0.5 percent of dried shallot powder, 0.1 to 0.5 percent of dried ginger powder, 0.1 to 0.5 percent of five spice powder, 5 to 8 percent of wheat meal, 3 to 10 percent of soybean flour and the balance of water. The processing method comprises the following steps of: 1)

processing raw materials; 2) removing fishy smell of the fishbone, and adjusting pH; 3) performing vacuum centrifugal defatting; 4) crushing, and homogenizing under high pressure; 5) seasoning; 6) heating and pressurizing for sterilization; and 7) cooling and packaging. The processing method has the advantages that: the fish resources can be fully utilized, and deteriorated fishbone is prevented from polluting the environment. The fishbone sauce produced by the technology has fine and smooth mouth feel, unique flavor, a little sediment and uniform color, and is easy to store.

A patent document CN101480251B disclosed the invention regarding a production raw material and a production technology of a natural bone calcium capsule which is mainly prepared by natural bone calcium, CPP, harp seal meat bone powder, VD3, lactose, VC, maltitol, VE, seadragon powder, VA and glycin according to a certain proportions. The invention has a reasonable formula according to the needs of human bodies, adds various vitamins and glycine, is favorable to the synthesis of collagen, is easy to absorb and is safe and nontoxic. A patent document CN104222216A disclosed the invention relates to high-calcium biscuit and a manufacturing method thereof. The high-calcium biscuit is made of low-gluten flour, fishbone broom corn millet, water, butter, white sugar, salt, sodium bicarbonate and vanilla powder. The high-calcium biscuit has the advantages that on the basis of raw materials of common biscuit, the fishbone broom corn millet is added, calcium content of the biscuit is increased, resources are effectively utilized, and the biscuit has unique seafood flavor. A patent document CN102551108A disclosed a high-calcium fish ball and a manufacture method thereof. The fish ball is made of minced fillet, fishbone paste, egg white, refined salt, monosodium glutamate, white ground pepper, garlic powder and the like according to fixed proportion. The manufacture method comprises the steps of 1) pretreating fish heads or fish bones, rinsing fresh chub heads or fish bones with ozone water, and washing the fresh chub heads or the fish bones with tap water; 2) manufacturing bone paste with the fish heads or the fish bones, and sequentially grinding the washed fish heads or the washed fish bones with a bone paste machine to obtain fish bone paste of certain particle diameter; 3) chopping and stirring, and placing weighted raw materials in a chopping and stirring machine to be chopped and stirred, continuously adding icy water to control temperature; 4) forming, and placing the chopped and stirred materials in a ball machine to be stirred to be formed; 5) heating to form, placed formed fish balls in water, and fishing the fish balls in tap water to be cooled when the fish balls float up; and 6) refrigerating, freezing the cooled fish balls with a double spiral quick freezer, and placing the fish balls in a refrigerator to be refrigerated. The high-calcium fish ball and the manufacture method are reasonable in formula, the raw materials are easy to obtain, production cost is low, and the manufacture method is easy to use, convenient to operate and suitable for industrialized production. A patent document CN102948820A disclosed the invention relates to a high-calcium freshwater fish ball and a preparation method of the high-calcium freshwater fish ball, belonging to the technical field of the processing and the producing of food. The minced fillet and the fishbone mud are taken as raw materials. The preparation method comprises the following steps of: adding shop fat with a certain quantity and the other auxiliary materials, chopping in a mixing way, forming fish ball, curing fish ball and the like. On the basis that the peculiar taste of the fish ball is guaranteed, the high-calcium freshwater fish ball provided by the invention is rich in elasticity, and has the loose, soft, fine and smooth mouth feel when being eaten, and the pursuing of modern people to nutrition health can be met. The problems that the calcium is sufficiently ingested by people, and the problem that the fish bone generated when the freshwater is deeply processed is not well used in the prior art can be solved. The additional value of the fish bone can be improved, a feasible technical scheme can be provided for the treatment of the fish bone, and the considerable economic benefit can be brought to the enterprises. A patent document CN1215797C disclosed a method for preparing whole fish calcium protein products will include scales and fishbone whole fish into fish flesh finely ground paste, then add protein-rich, organic calcium, phosphorus, iron, raw materials, then add spices natural thickeners, and into the dough, tablet molding, baked. The method overcomes the disadvantages of the prior art, science and technology and reasonable, comprehensive nutrition rich. A patent document CN103704757A disclosed a high calcium sausage consists of fish bones 8-10% (w/w). A patent document CN103932288A disclosed a high-calcium sesame paste and a preparation method thereof. The high-calcium sesame paste is characterized by being composed of the following raw materials in parts by weight: 100 to 110 parts of black sesame, 3 to 4 parts of radix astragali, 4 to 5 parts of *ginseng*, 4.5 to 6 parts of dried radix rehmanniae, 3.5 to 4 parts of radix scrophulariae, 2 to 3 parts of banksia rose, 1 to 2 parts of canscora, 2 to 2.5 parts of Machilus *leptophylla*, 3 to 4 parts of green pepper, 8 to 9 parts of maize germ oil, 7 to 8 parts of polished rice, 30 to 33 parts of coconut juice, 30 to 35 parts of fish bone, 10 to 12 of dried bean curd, 4 to 5 parts of tomato, 7 to 8 parts of bread crumb, 3 to 4 parts of vital gluten, 0.3 to 0.4 part of *lactobacillus*, and 4 to 5 parts of nutritional additive. Fish bones are added to increase the calcium content, thus the sesame paste can promote the bone growth and prevent the osteoporosis. A patent document CN104041586A disclosed a high-calcium yoghourt and a preparation method thereof. The high-calcium yoghourt is characterized by being prepared from the following raw materials by weight: 500 to 520 parts of fresh milk, 2 to 3 parts of red sage root, 1 to 2 parts of isatis root, 3 to 4 parts of officinal *magnolia* flower, 1 to 2 parts of achyranthes root, 4 to 5 parts of pomegranate leaf, 2 to 3 parts of Viola *formosana* Hayata, 1 to 2 parts of narrow-leaved *lindernia*, 4 to 5 parts of peanut, 3 to 4 parts of pea, 13 to 14 parts of white vinegar, 20 to 22 parts of wheat germ powder, 14 to 15 parts of brown rice powder, 10 to 11 parts of towel gourd, 15 to 20 parts of purple cabbage, 50 to 55 parts of fish-bone, 10 to 12 parts of lactic acid bacteria and 10 to 12 parts of a nutrition additive. The high-calcium yoghourt according to this invention has comprehensive and balanced nutrients; moreover, the high-calcium yoghourt contains a plurality of Chinese herbal components, so the high-calcium yoghourt is capable of invigorating blood circulation, freeing the channels, invigorating the spleen, benefiting the stomach, nourishing the liver and the kidney and strengthening muscles and bones after frequent eating. A patent document EP0584951A2 disclosed a meat product having improved moisture retention, especially when cooked, is provided by incorporating into ground meat, water and a specially prepared calcium salt of citric acid. An improved cooked meat product is also provided. Also included is a process for producing these unique meat products. A patent document CN101708054A disclosed a method for preparing a high-calcium soup-stock fish ball by using channel catfish bone, which is characterized by comprising the following steps of: removing, head, tail and side wings of a fish skeleton, remaining a fish steak and ensuring that the fish skeleton has components with black skin; rinsing the fish skeleton with clean water, draining and slightly freezing the fish skeleton at 0° C.; crushing the slightly-frozen fish skeleton by a crusher and grinding the powder by colloid into fishbone crushed meat with the granule no more than 1 mm; centrifuging and dewatering the ground fishbone crushed meat for later use; preparing the fishbone crushed meat for later use, accessories and seasonings together into an outer coating material; and evenly stirring the outer coating material with pork emulsion, sugar, salt and agar to be prepared into stuff core, placing the stuff core and the outer coating material into a forming machine for shaping and then boiling the shaped material with water to cure to obtain fish balls. By the method, the added value of products can be effectively improved, and the high-efficiency comprehensive utilization of the products can be promoted. A patent document CN102726764A disclosed a method for preparing snack food of high-calcium fishbone slice. The method comprises the following steps: washing the raw material, namely, the fishbone cleanly; getting rid of the waste material, and subsequently mixing with icy water and carrying out smashing treatment till the grain size of the formed fishbone slime is 50-150 meshes, wherein the mass ratio of the fishbone to the icy water mixture is 1:3-3:1; afterwards mixing the obtained pasty fishbone with auxiliary material; modulating the flavor according to desired taste; further processing the mixture into blanks of set specification; subsequently drying and frying sequentially; and packaging in vacuum so as to prepare the objective product. A patent document CN101028072A disclosed a nutritive health-care biologic bone calcium food in the form of capsule for supplementing bone calcium to human body is prepared from fresh pig bone through superfine pulverizing to become bone paste, high-temp and pressure sterilizing, fermenting by bacterium *lactis*, mixing it with VD and cascin phosphopeptide, emulsifying, homogenizing, adding *pueraria* root starch and calcium carbonate, spray granulating, cooling, and filling the particles in capsules. A patent document CN101703168B disclosed a pasty pet canned food which is prepared by the following raw materials in parts by weight: 30-50 parts of chicken-bone paste, 3-10 parts of animal liver, 2-7 parts of corn starch, 0.1-0.5 part of D-sodium erythorbate, 0.1-0.3 part of edible salt and 0.005-0.01 part of sodium nitrite. The preparation method comprises the following steps: processing the chicken bone frame, stirring, grinding, secondary stirring, evacuating, canning and sterilizing. In the invention, high-calcium chicken bone is adopted as a main raw material, the nutritional ingredients thereof are richer than meat, and the calcareous content is far incomparable than that of the meat; the D-sodium erythorbate is an important antioxidant preservative in food industry, can keep color and natural taste of food, prolong quality guarantee period, eliminate adverse phenomena, such as discoloring, foreign taste and turbidity and alike, and has no toxic and side effects. The pasty pet canned food of the invention has simple process and is convenient for popularization and edibility, is easy to be preserved and transported; and the nutritional ingredients of the prepared product are richer.

Based on the fish bone compositions which contain inorganic substances 60-70%, mainly calcium phosphate and hydroxyapatite and the remaining organic component, i.e., collagen. In order to produce calcium source for enrichment of food products, the bone must be treated and changed to an edible form by softening the bone structure, remove impurity such as protein and fat to get the good quality calcium to apply in food and supplement products. The methods for protein and fat removal vary from physical, chemical and biological processes.

This invention provides the process for preparing fish bone powder.

SUMMARY OF THE INVENTION

This disclosure discloses a process of preparing fish bone powder comprising:
a. Pre-treatment of fish bone;
b. Removal of non-polar components from the pre-treated bone obtained from step a with alkali solution or solvent;
c. Drying of the alkali or solvent treated bone obtained from the step b; and
d. Milling or pulverizing of the dried bone obtained from step c Wherein a calcium-rich powdered product can be obtained from the above process. The calcium powder according to this invention can be used as an ingredient and calcium supplement in food products, especially seafood.

BRIEF DESCRIPTION OF THE DRAWING

Specific implementations of the invention will now be described with reference to the following tables, which are provided by way of example, and not limitation.

DETAILED DESCRIPTION OF THE INVENTION

A process of preparing fish bone powder according to this invention comprises the following steps:

a. Pre-treatment of fish bone;
b. Removal of non-polar components from the pre-treated bone obtained from step a with alkali solution or solvent;
c. Drying of the alkali or solvent treated bone obtained from the step b; and
d. Milling or pulverizing of the dried bone obtained from step c.

The pre-treatment of fish bone according to this invention comprises of the following steps;
a. Removal of blood meat from the bone;
b. Pre-heating the bone at 80-120° C. for 50-90 minutes;
c. Reducing the size of the pre-heated bone to 0.5 cm; and
d. Washing the bone obtaining from step c. with water.

The removal of non-polar components from the pre-treated bone with the alkali solution comprises the following steps;
a. Mixing the said pre-treated bone with the alkali solution at the concentration of 0.2-1% (w/v) and the ratio between the said crushed bone and the said alkali solution is the range of 1:1-2 (w/v);
b. Heating the mixture obtaining from step a at the temperature between 70-100° C. for 45-120 minutes; and
c. Washing the bone obtaining from step b with water.

The preferred solvent used for removal of non-polar components from the pre-treated bone is isopropanol or hexane.

In another embodiment, a process of preparing fish bone powder comprises the following:
a. Pre-treatment of fish bone.
b. Removal of protein components from the pre-treated bone obtained from step a with an enzyme or the combination of enzymes;
c. Drying of the bone obtained from step b; and
d. Milling or pulverizing of the dried bone obtained from step c.

Furthermore, the removal of protein components from the pre-treated bone with an enzyme or the combination of enzymes comprises of the following steps;
a. Mixing the pre-treated or alkali treated bone with water at the ratio of pre-treated or alkali treated bone and water between 1:1-2;
b. Adjusting the pH of the mixture obtained from step a to 8.0-8.5 with NaOH or KOH;
c. Adding the enzyme or the combination of enzymes selected from the group of protease (dosage 0.2%) to the said mixture;
d. Incubating the said mixture with enzymes at the temperature between 50-55° C. with the agitation speed between 1000-1500 rpm for 0.5-1.5 h;
e. Inactivation of the enzymes by heating the said mixture at the temperature above 90-95° C. for at least 1 hour;
f. Filtration the said mixture to separate the remaining bone materials and the aliquot;
g. Washing the said bone material with water until the pH of the said bone is 7.0;
h. Drying the said bone; and
i. Keeping the dried bone in the cool and dry place.

Wherein the protease enzyme can be selected from the group of proteases derived from plants, animals or microorganisms, preferably, the enzyme is Protamex enzyme (protease complex: serine endopeptidase E.C.3.4.21.62 and metalloendopeptidase E.C 3.4.24.28, Novozyme)

In another embodiment, a process of preparing fish bone powder comprising:
a. Pre-treatment of fish bone;
b. Removal of impurities from the pre-treated bone obtained from step a with boiling water at 100° C.;
c. Drying of the bone obtained from step b; and
d. Milling or pulverizing of the dried bone obtained from step c.

The calcium product obtained from this invention has a particle size of less than 100 microns (micrometers) or in the range of 0.1 to 30 microns, but most preferably at 10 microns, and experiments below are the examples of the embodiments according to this invention.

Experimental 1

This experiment shows the effect of the alkali soaking time on final fat, protein, TBA contents and color of dried tuna calcium.
Materials and Method:
The main frame of tuna bone was crushed to size 1-2 cm then soaked the crushed bone in sodium hydroxide solution (0.5%) with the ratio of crushed bone:NaOH solution at 1:1 at the temperature between 90-95° C., for 1 hour. The alkali-treated bone was rinsed with tap water until the pH of alkali-treated bone is neutral before drying in hot air oven at ° C. for 1 hour. The dried crushed bone is referred to as dried tuna calcium in this invention.

Figure 1:
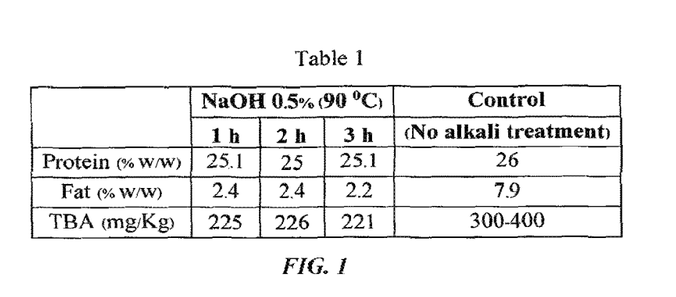
FIG. 1 is showing protein, fat and TBA contents of dried tuna calcium after alkali soaking at different time (Table 1)

It is clearly shown that alkali treatment can significantly reduce the fat content and the TBA value of crushed bone as shown in Table 1.

Figure 2:
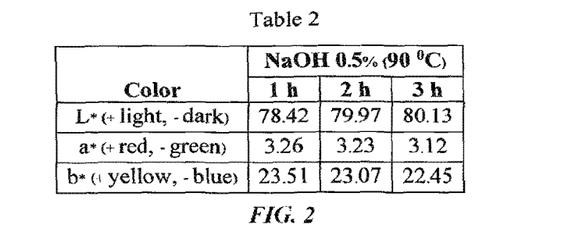
FIG. 2 is showing color of dried tuna calcium after alkali soaking at different time (Table 2)

The results in tables 1 and 2 show that alkali treatment can remove muscle protein and the increase of alkali soaking time slightly reduces fat and TBA content of the dried tuna calcium. It also helps to improve the color of tuna calcium.

Experimental 2

This experiment shows the fat removal by using solvent.
Material and Method:
The main frame of tuna bone was crush to size 1-2 cm then soaked crushed bone in sodium hydroxide solution (0.5%) with the ratio of crushed bone:NaOH solution at 1:1 at the temperature between 90-95° C., for 1 hour. The alkali-treated bone was rinsed with tap water until the pH of alkali-treated bone is neutral before drying in hot air oven at 90° C. for 1 hour. The dried tuna calcium is mixed with hexane with the ratio 1:5 (dried tuna calcium: hexane) before incubation of the mixture at 58-60° C. for 30 min. in a shaking water bath. Filter the solvent extracted, dried tuna calcium and dry the said material with hot air oven at 37° C. for 48 hr to remove solvent residue.

Figure 3:
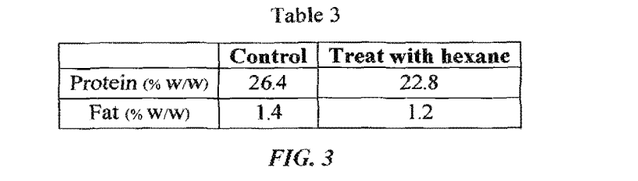
FIG. 3 is showing protein and fat content of dried tuna calcium after treated with hexane (Table 3)

The results shown in Table 3 indicate that hexane extraction helps to reduce the fat content of dried tuna calcium.

Experimental 3

This experiment shows the bone cleaning process by using protease enzyme.
Material and Method:
The main frame of tuna bone was crush to size 1-2 cm. The crushed bone is mixed with water at ratio 1:1 and protease enzyme at dosage 2 g/Kg was added to the crushed bone. Incubate the said mixture at the temperature of 50-55° C. for 60 mins in a water bath shaker. Heat the mixture to 90° C. for 60 min in order to inactivate the enzyme activity.

Separate the solid part by filtration and rinse the remaining bone with water. The said bone is dried in hot air oven at 90° C. for 1 hour.

Figure 4:
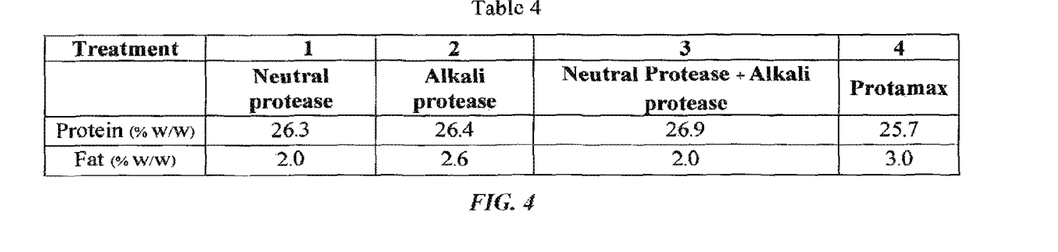
FIG. 4 is showing protein, and fat of dried tuna calcium after treated with different protease enzymes (Table 4)

The results are shown on Table 4.

Experimental 4

This experiment shows the bone cleaning process by using the combination of alkali soaking and protease enzyme.

Materials and Method:

The main frame of tuna bone was crush to size 0.5-1 cm then soaked the crushed bone in sodium hydroxide solution (0.5%) with the ratio of crushed bone:NaOH solution of 1:1 at 90-95° C., for 1 hour. The treated crushed bone was rinsed with tap water until the pH of alkali-treated bone is neutral before drying. The treated bone is mixed with water at the ratio of 1:1. Protease enzyme was added at dosage of 0.2 g/100 g crushed bone and incubate the said mixture at 50-55° C. for 60 mins in water bath with agitation. Heat the said mixture to 90° C. for 60 min to inactivate enzyme activity then filter the remaining bone and rinsed by water. The bone is dried in hot air oven at 90° C. for 1 hour.

Figure 5:
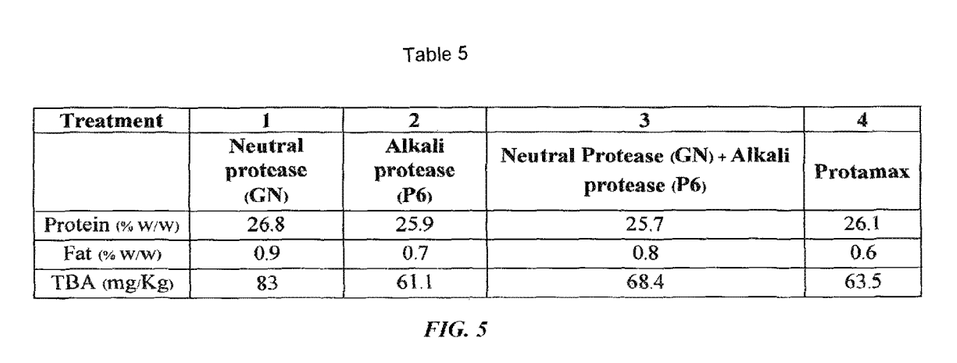
FIG. 5 is showing protein, fat and TBA contents of dried tuna calcium after treated with the combination process of soaking with alkali and protease enzyme treatments (Table 5)

The results shown in Table 5 indicate that bone cleaning by alkali soaking followed by enzymatic treatment with protease can reduce fat and TBA contents of tuna calcium. The Alkali protease (P6) and Protamex show lowest fat and TBA content among 4 treatments.

Experimental 5

This experiment shows the effects of pretreatment of tuna bone with hot water and steam on the removal of fat and TBA content of dried bone before the alkali soaking and enzymatic treatments.

Material and Method:

The main frame of tuna bone was treated with hot water and steam at 95° C. for before crushing the said bone to size 0.5-1 cm. The crushed bone was then soaked in sodium hydroxide solution (0.5%) with the ratio of 1:1 at 90-95° C., for 1 hour and rinsed with tap water to remove alkali residue. The treated bone was mixed with water at ratio of 1:1. Protease enzyme was added at dosage of 0.2 g/100 g crushed bone and incubate the mixture at 50-55° C. for 60 mins in water bath with agitation. The mixture was heated at 90° C. for 60 min in order to inactivate the enzyme activity. Filter the solid part and rinsed with water. The remaining bone is dried in hot air oven at 90° C. for 1 hour.

Figures 6, 7:
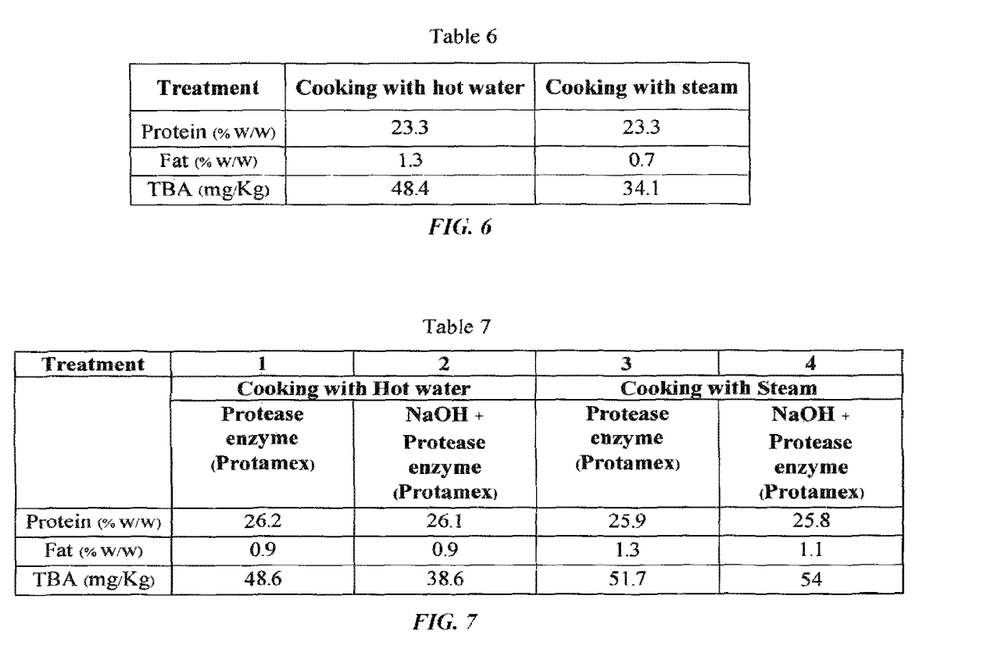
FIG. 6 is showing protein, fat and TBA contents of dried tuna calcium after pretreatment with hot water and steam cooking, and treatment with the combined processes of soaking with alkali and enzymatic treatments with protease (Table 6)
FIG. 7 is showing protein, fat and TBA contents of dried tuna calcium pretreated with cooking with hot water and steam and treated with Protease enzyme in comparison to the combined process of soaking with alkali and enzymatic treatment with protease (Table 7)

The results are shown on Table 6.

Experimental 6

This experiment shows the effect of cooking tuna bone by hot water and steam before crushing on fat and TBA contents of dried tuna calcium treated with protease enzyme in comparison to the combined process of soaking with alkali and enzymatic treatment with protease.

Materials and Method:

The main frame of tuna bone was cooked with hot water and steam at 95° C. for before crushing to size 0.5-1 cm.

The precooked and crushed bone was soaked in sodium hydroxide solution (0.5%) with the ratio of 1:1 at 90-95° C., for 1 hour and rinsed with tap water to remove alkali residue.

The alkali treated bone was mixed with water at the ratio of 1:1. Protease enzyme was added at dosage of 0.2 g/100 g to the crushed bone and incubate at 50-55° C. for 60 mins in water bath with agitation. The mixture was heated to 90° C. for 60 min in order to inactivate the enzyme activity. Filter the solid part and rinsed with water. The remaining bone is dried in hot air oven at 90° C. for 1 hour.

Figure 8:
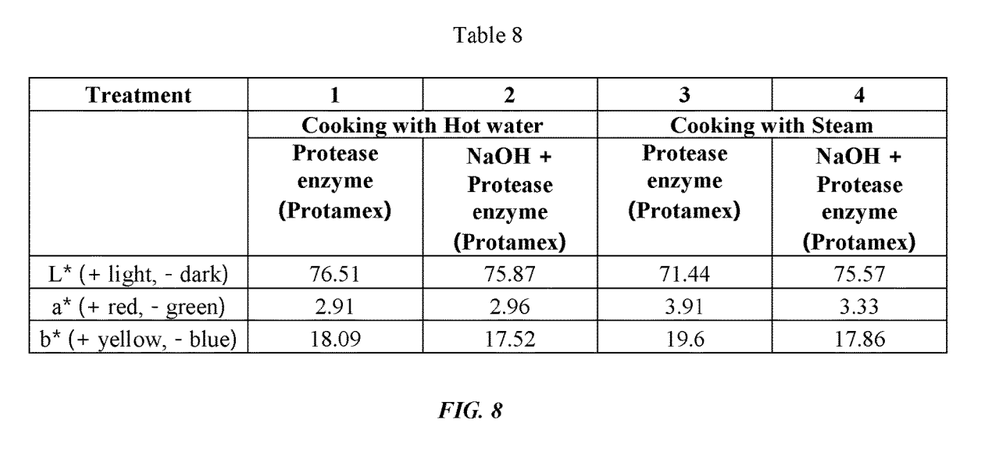
FIG. 8 is showing color and appearance of dried tuna calcium pretreated with cooking with hot water and steam and treated with Protease enzyme in comparison to the combined process of soaking with alkali and enzymatic treatment with protease (Table 8)
Figure 9:
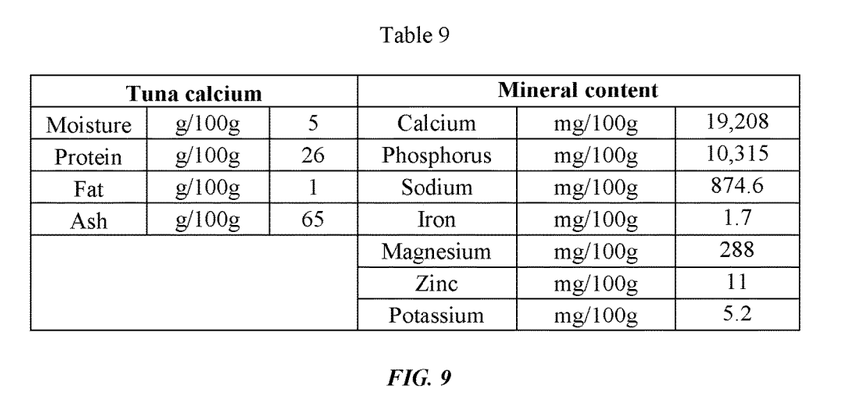
FIG. 9 is showing analysis results of major components of tuna calcium (Table 9)
Figure 10:
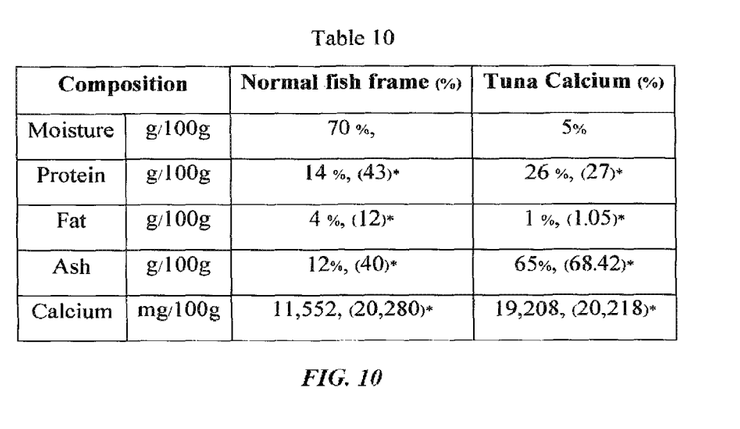
FIG. 10 is showing composition of tuna calcium compared with normal fish frame and percent on dry basis thereof (Table 10)
Figure 11:
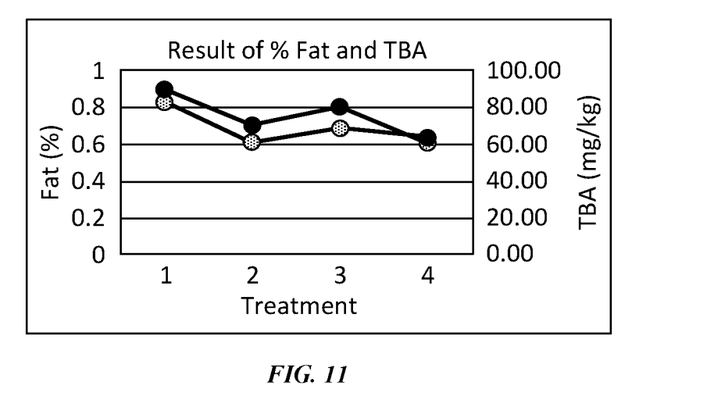
FIG. 11 is showing the graph of fat and TBA contents of dried tuna calcium after treated with the combination process of soaking with alkali and protease enzyme treatments.

The results show that pretreatment by cooking with hot water helps to reduce the fat content better than cooking with steam. Soaking the crushed bone with alkali also helps to improve the appearance of the tuna calcium. Protease enzyme further helps to lower the fat content and reduce oxidation (TBA value) of tuna calcium as shown in Table 7 and 8. The fish bone powder obtained from the processes according to this invention contain the component as shown in table 9. As mentioned above, the most preferred fish bone powder comprises the following components: protein 20-30%, fat 0.5-2% and ash And mineral contents of the said fish bone powders comprising calcium 18-22 g/100 g, phosphorus 5-15 g/100 g, sodium 0.5-1.5 g/100 g, magnesium 0.1-0.5 g/100 g and potassium 0.01-0.1 g/100 g. The element analysis shows that ratio of Ca/P of tuna calcium is 1.86 which is within the range of natural calcium found in bone (Ca/P 1.6-2.0).

The invention claimed is:

1. A process for preparing fish bone powder comprising the following steps:
    (a) pre-treating a fish bone, pre-treating the fish bone comprising:
        removing meat from the fish bone;
        reducing the size of the fish bone to 0.5-2 cm; and
        washing the fish bone with water after reducing the size of the fish bone;
    (b) removing non-polar components from the pre-treated fish bone obtained from step (a) with an alkali solution by heating a mixture of the pre-treated fish bone and the alkali solution for 0.75-2 h, wherein the alkali concentration in the alkali solution is in the range of 0.2-1% w/v;
    (c) removing protein components from the fish bone obtained from step (b) with a protease enzyme by incubating a mixture of the fish bone and the protease enzyme for 0.5-1.5 h;
    (d) drying the fish bone obtained from step (c); and
    (e) milling or pulverizing the fish bone obtained from step (d) to provide the fish bone powder,
    wherein a fat content in the fish bone powder is 0.5-2 wt. %.

2. The process for preparing fish bone powder according to claim 1, wherein removing the non-polar components from the pre-treated fish bone comprises the following steps:
    mixing the pre-treated fish bone obtained from step (a) with the alkali solution, wherein a ratio between the pre-treated fish bone and the alkali solution is in the range of 1:1-2 w/v;
    heating the obtained mixture at a temperature between 70-100° C. for 0.75-2 h; and
    washing the fish bone with water.

3. The process for preparing fish bone powder according to claim 1, wherein removing the protein components from the fish bone comprises the following steps:
    mixing the fish bone obtained from step (b) with water;
    adjusting the pH of the obtained mixture to 8.0-8.5 with NaOH or KOH;
    adding the protease enzyme to the mixture;
    incubating the mixture with the protease enzyme at a temperature between 50-55° C. with an agitation speed between 1000-1500 rpm for 0.5-1.5 h;
    inactivating the protease enzyme by heating the mixture at a temperature above 90° C. for at least 1 hour;

filtrating the mixture to separate the fish bone and a liquid portion of the mixture;
washing the fish bone with water until the pH of the fish bone is 7.0;
drying the fish bone; and
keeping the dried fish bone in a cool and dry place.

4. The process for preparing fish bone powder according to claim 1, wherein the fish bone is obtained from a fresh water fish.

5. The process for preparing fish bone powder according to claim 1, wherein the fish bone is obtained from a marine fish selected from the group consisting of tuna, mackerel and salmon.

6. The process for preparing fish bone powder according to claim 5, wherein the fish bone is a tuna fish bone.

7. The process for preparing fish bone powder according to claim 1, wherein the fish bone powder further comprises protein of 20-30 wt. % and ash of 50-70 wt. %.

8. The process for preparing fish bone powder according to claim 7, wherein the fish bone powder comprises one or more mineral contents selected from the group consisting of calcium 18-22 g/100 g, phosphorus 5-15 g/100 g, sodium 0.5-1.5 g/100 g, magnesium 0.1-0.5 g/100 g and potassium 0.01-0.1 g/100 g.

9. The process for preparing fish bone powder according to claim 1, wherein a median diameter of a particle size distribution of the fish bone powder is lower than 100 microns.

10. The process for preparing fish bone powder according to claim 9, wherein the median diameter of the particle size distribution of the fish bone powder is in the range of 0.1 to 30 microns.

11. The process for preparing fish bone powder according to claim 10, wherein the median diameter of the particle size distribution of the fish bone powder is microns.

12. The process for preparing fish bone powder according to claim 1, further comprising extracting the non-polar components from the fish bone obtained from step (b) with a solvent.

13. The process for preparing fish bone powder according to claim 12, wherein the solvent is isopropanol.

14. The process for preparing fish bone powder according to claim 12, wherein the solvent is hexane.

15. The process for preparing fish bone powder according to claim 1, wherein pre-treating the fish bone is conducted with boiling water at 100° C.

16. The process for preparing fish bone powder according to claim 1, wherein the protease enzyme dosage is 0.2 wt. % by weight of the fish bone.

17. The process for preparing fish bone powder according to claim 1, wherein the protease enzyme comprises a complex of serine endopeptidase and metalloendopeptidase.

18. A process for preparing fish bone powder, comprising:
pre-treating a fish bone to provide a pre-treated fish bone, pre-treating the fish bone comprising:
removing meat from the fish bone;
reducing the size of the fish bone to 0.5-2 cm; and
washing the fish bone with water after reducing the size of the fish bone to provide the pre-treated fish bone;
processing the pre-treated fish bone in an alkali solution for 0.75-2 h followed by a protease enzyme for 0.5-1.5 h to provide a treated fish bone;
drying the treated fish bone to provide a dried fish bone; and
milling or pulverizing the dried fish bone to provide the fish bone powder,
wherein the fish bone powder comprises mineral contents selected from the group consisting of calcium 18-22 g/100 g, phosphorus 5-15 g/100 g, sodium 0.5-1.5 g/100 g, magnesium 0.1-0.5 g/100 g and potassium 0.01-0.1 g/100 g, and
wherein a fat content in the fish bone powder is 0.5-2 wt. %.

19. The process for preparing fish bone powder according to claim 18, wherein processing the pre-treated fish bone by the protease enzyme is conducted at a pH from 8.0 to 8.5.

* * * * *

UNITED STATES PATENT AND TRADEMARK OFFICE
CERTIFICATE OF CORRECTION

PATENT NO. : 11,974,589 B2
APPLICATION NO. : 16/069828
DATED : May 7, 2024
INVENTOR(S) : Tunyawat Kasemsuwan et al.

Page 1 of 1

It is certified that error appears in the above-identified patent and that said Letters Patent is hereby corrected as shown below:

In the Claims

<u>Column 11, Claim 11, Line 35:</u>
"powder is microns."
Should read:
--powder is 10 microns.--

<u>Column 12, Claim 15, Lines 6 and 7:</u>
"wherein pre-treating the fish bone is conducted with boiling water at 100° C."
Should read:
--wherein step (a) further comprises removing impurity from the fish bone with boiling water at 100° C.--

Signed and Sealed this
Twenty-seventh Day of August, 2024

Katherine Kelly Vidal
*Director of the United States Patent and Trademark Office*